United States Patent
Swoboda

(10) Patent No.: US 8,384,420 B2
(45) Date of Patent: Feb. 26, 2013

(54) PREVENTING HANGS IN A SYSTEM WITH SYNCHRONIZED OPERATION USING STALLS

(75) Inventor: Gary L. Swoboda, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/545,346

(22) Filed: Aug. 21, 2009

(65) Prior Publication Data

US 2010/0250996 A1    Sep. 30, 2010

Related U.S. Application Data

(60) Provisional application No. 61/090,821, filed on Aug. 21, 2008.

(51) Int. Cl.
*H03K 19/003* (2006.01)
(52) U.S. Cl. .................. 326/21; 713/375; 713/502
(58) Field of Classification Search ............ 326/93, 326/21, 46; 710/61; 713/323
See application file for complete search history.

(56) References Cited

U.S. PATENT DOCUMENTS

| 5,469,553 A | * | 11/1995 | Patrick ..................... 713/323 |
| 6,038,622 A | * | 3/2000 | Swoboda et al. ............. 710/61 |
| 6,122,690 A | * | 9/2000 | Nannetti et al. ............. 710/311 |

* cited by examiner

*Primary Examiner* — Crystal L Hammond
(74) *Attorney, Agent, or Firm* — Robert D. Marshall, Jr.; Wade James Brady, III; Frederick J. Telecky, Jr.

(57) ABSTRACT

This invention is a method of operating a system having multiple finite state machines where each finite state machine generating a ready signal when its operation is complete. This invention selects a set of the finite state machines to participate in an operation. If one or more of the finite state machines are selected for operation, the method waits until all selected finite state machines generate the ready signal. If none of the finite state machines are selected for operation, the method waits until at least one non-selected finite state machine generates the ready signal. This waiting can be accomplished with a precharge-conditional discharge circuit used for voting.

1 Claim, 3 Drawing Sheets

PREVENTING HANGS IN A SYSTEM WITH SYNCHRONIZED OPERATION USING STALLS

BACKGROUND OF THE INVENTION

This invention is a method of operating a system having multiple finite state machines where each finite state machine generates a ready signal when its operation is complete. This invention selects a set of the finite state machines to participate in an operation. If one or more of the finite state machines are selected for operation, the method waits until all selected finite state machines generate the ready signal. If none of the finite state machines are selected for operation, the method waits until at least one non-selected finite state machine generates the ready signal. This waiting can be accomplished with a precharge-conditional discharge circuit used for voting.

SUMMARY OF THE INVENTION

This invention is a method of operating a system having multiple finite state machines where each finite state machine generating a ready signal when its operation is complete. This invention selects a set of the finite state machines to participate in an operation. If one or more of the finite state machines are selected for operation, the method waits until all selected finite state machines generate the ready signal. If none of the finite state machines are selected for operation, the method waits until at least one non-selected finite state machine generates the ready signal. This waiting can be accomplished with a precharge-conditional discharge circuit used for voting.

BRIEF DESCRIPTION OF THE DRAWINGS

These and other aspects of this invention are illustrated in the drawings, in which.

DETAILED DESCRIPTION OF PREFERRED EMBODIMENTS

There are times where multiple finite state machines are operated in parallel. These state machines may or may not be able to provide input and output at the same pace. In this case these state machines provide a system ready indication when they are able to accept input and provide output. This system ready output is combined in a manner to determine when all of these machines are ready to proceed. These state machines literally vote on when to proceed. A unanimous vote to proceed is required before the state machines proceed.

Figure 1:
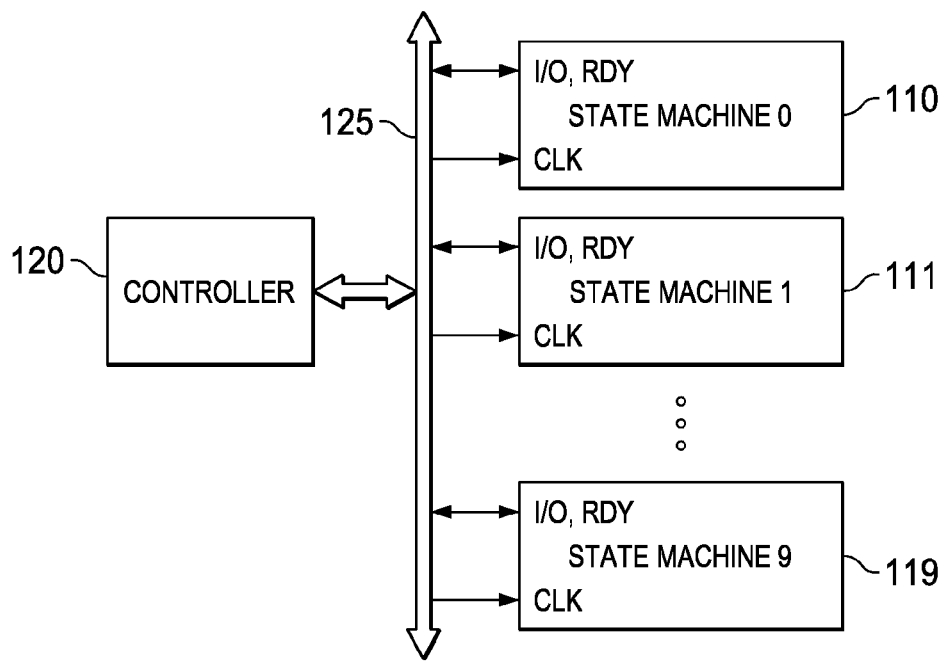
FIG. 1 illustrates an example system using multiple finite state machines.

FIG. 1 illustrates an example system using multiple finite state machines. FIG. 1 illustrate finite state machine 0 110, finite state machine 1 111 and finite state machine 9 119 representing the multiple finite state machines. Each finite state machine 110 to 119 receives a clock signal from bus 125. Each finite state machine 110 to 119 has a combined input/output (I/O) and ready signal (RDY) line connected to bus 125. This single line serves both as input and output to the finite state machine and enables ready signaling as detailed below. Controller 120 is also connected to bus 125. Controller 120 can supply the clock signals to the finite state machines 110 to 119, supply inputs, receive outputs and control the system.

If the voting is needed but not available a loss of synchronization of some of the machines may occur with a corresponding system malfunction. This could result in a catastrophic failure in certain system applications. A method to detect that this may occur and prevent this from happening is described herein.

Figure 2:
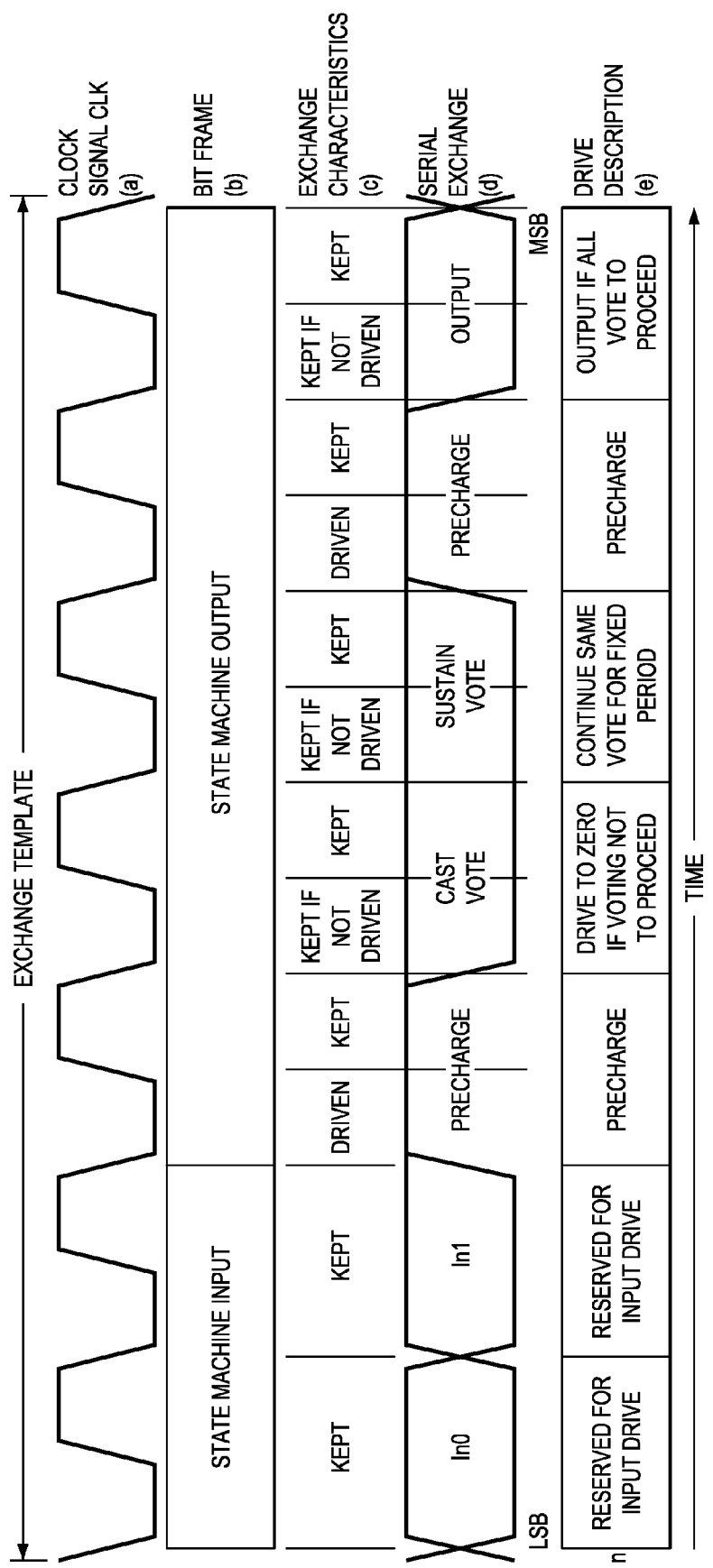
FIG. 2 illustrates an example of information exchange in a system such as illustrated in FIG. 1.

With minimum pin interfaces illustrated in FIG. 1 the information being exchanged and the vote to proceed can exchanged serially with a bit or bits in the stream providing a means for the voting to proceed. FIG. 2 illustrates an example of such an exchange.

FIG. 2a illustrates the clock signal CLK supplied to all finite state machines 110 to 119. FIG. 2b illustrates the separation of time defined by clock pulses into a state machine input period and a state machine output period. The example illustrated in FIG. 2 shows two clock cycles in the state machine input period and five clock cycles in the state machine output period. These intervals are exemplary only, other time lengths are feasible.

FIGS. 2c and 2d illustrate further division of the state machine input period and the state machine output period into specific signaling intervals. In this example, a least significant bit In0 of an input is signaled during a first clock cycle of the state machine input period. As noted in FIG. 2c, this value is kept on the signaling line. A most significant bit In1 of the input is signaled during a second clock cycle of the state machine input period. FIG. 2c shows this value is also kept on the signaling line. FIG. 2e illustrates that these clock cycles are "reserved for input drive."

The first clock cycle of the state machine output period is reserved for precharge. As detailed below the voting using ready signals involves a precharge-conditional discharge sequence. The first clock cycle of the state machine output period is this precharge driven by controller 120 during a first half cycle and held by a keeper circuit during a second half cycle.

FIG. 2d shows the next clock cycle in this example devoted to the finite state machine casting votes. This exact mechanism will be further explained below. FIG. 2c shows that a first half cycle is devoted to being driven or kept. Whether this is driven to zero or kept high depends upon the vote cast. FIG. 2c shows the second half cycle which is kept only. FIG. 2d shows a second voting cycle called "Sustain Vote" which is the same as the initial "Cast Vote" cycle.

FIG. 2d then shows another precharge sequence. The next clock cycle of the state machine output period is this precharge driven by controller 120 during a first half cycle and held by a keeper circuit during a second half cycle. FIG. 2d then shows an output cycle based upon a conditional discharge sequence. FIG. 2 shows output of only a single bit, however this is exemplary only and more bits can be transmitted as needed.

In order to increase efficiency controller 120 selects the information that is transferred in the exchange template shown in FIG. 2. The input, voting and output can be included and excluded. A means to inform all participants of the format of the exchange is provided.

The participants in an exchange may be defined by a procedure other than the procedure defining the format. It is therefore possible to specify the use of a format that does not support voting when a vote to proceed is needed.

The RDY bit(s) with some transfer formats is used to indicate the participants have completed the processing of the input information received previously and are ready to output information. When the RDY bit in the exchange is reached a participant indicates it is not ready to proceed until it has met the above mentioned criteria.

Figure 3:
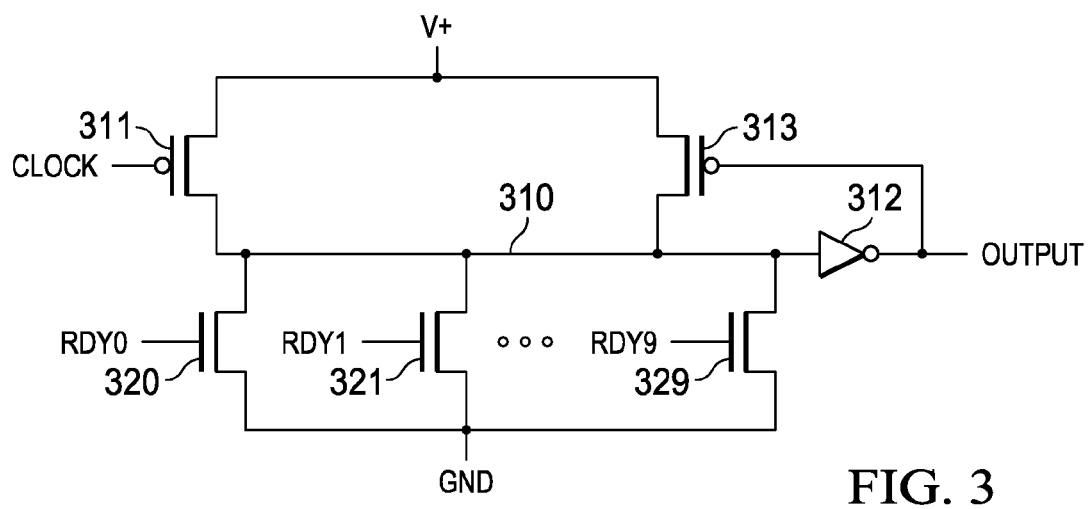
FIG. 3 illustrates an example precharge/conditional discharge voting circuit.

Voting is supported by using a precharge/discharge drive scheme. FIG. 3 illustrates an example circuit. Precharge P-channel transistor 311 periodically couples node 310 to the positive supply voltage V+ as controlled by a Clock input signal. This process occurs during one of the precharge intervals illustrated in FIG. 2d. The charge on node 310 is maintained by keeper P-channel transistor 313 after precharge transistor 311 is switched OFF by the Clock signal during a kept interval illustrated in FIG. 2c. Voting occurs based upon the logical state of each RDY bit from finite state machines 110 to 119. As shown in FIG. 3, the ready signal RDY0 to RDY0 of respective finite state machines 110 to 119 drives the gate of a corresponding N-channel transistor 320 to 329. Each transistor 320 to 329 has a source-drain path connected between node 310 and ground. A 1 or high ready signal causes the corresponding transistor to be OFF. This does not change the charge on node 310. A 0 or low ready signal causes the corresponding transistor to be ON. The channel width of transistors 320 to 329 is constructed larger than the channel width of keeper transistor 313. Thus node 310 can be discharged by any one of transistors 320 to 329 turned ON to sink more current to ground than keeper transistor 313 can source from the positive voltage supply V+. Inverter 312 senses the voltage on node 310 and produces a corresponding signal at Output. In this example if all the ready signals are 1, then the Output is 0. If any one of the ready signals is 0, then the Output is 1.

A single not-ready-to-proceed vote (ready signal of 0) causes a repeat of the vote with another Precharge/RDY bit sequence. The number of bits where the vote is sustained is programmable for timing reasons to accommodate propagation delays so a participants can view the vote.

In cases where there is a RDY bit with no Precharge called the non-voting case, there is only one participant and this participant drives the RDY bit value to a logic 0 until is ready to proceed. Once it is ready to proceed it drives the RDY bit value to a logic 1 for one or more bit periods. The number of bits where the RDY bit is driven to a logic 1 and sustained at this value is programmable for timing reasons to accommodate propagation delays so all participants can view the vote.

When more there is more than one participant that requires the ability stall the exchange progression (RDY bits are needed), voting on the RDY value avoids the loss of synchronization would occur if voting on whether to proceed is not provided.

Exchange formats that do not support voting malfunction when there are multiple participants that require stalls (RDY bits that are 0) because some participants indicate ready to proceed while other indicate not ready to proceed. This would result in drive conflicts if voting were not used to create the RDY bit (it is driven to a logic 1 or a logic 0). The detection of more than one drive candidate causes the RDY bit is to always driven to a logic 1. The detection of more than one drive candidate can be accomplished by instrumenting the selection process. This ignores the stall information with there being a loss of synchronization in participants that desire a stall.

To avoid this situation a participant is placed offline when there is more than one participant and non-voting RDY bits are included in the exchange. This occurs if there is more than one participant when the exchange format is changed to include RDY bits without voting or a participant is added or is queued to be added to participant by a subsequent event. The offline condition is a state where operation ceases in a know state so the operation may be resumed at a later point in time when the offending conditions have been negated.

There are three cases.

Case A includes more than one participant and the indication to proceed is created by voting. In CASE A the system ready outputs of all participants selected by controller 120 are combined as illustrated in FIG. 3 to identify when all participants are ready to proceed. These participants vote on when to proceed via the corresponding ready signal. It takes a unanimous vote before the finite state machines can proceed. All other non-participants monitor the voting and proceed when the vote to proceed is unanimous.

Case B includes one participant and the ready to proceed is created by this candidate with no voting. In case B a single participant is chosen by controller 120 and it indicates when it is ready to proceed. Controller 120 may choose the participant from a pool or plurality of participants. Voting is not used in this case. This participant indicates it is ready to proceed with all non-participants monitoring the ready indication and proceeding when the ready-to-proceed indication is detected.

Figure 4:
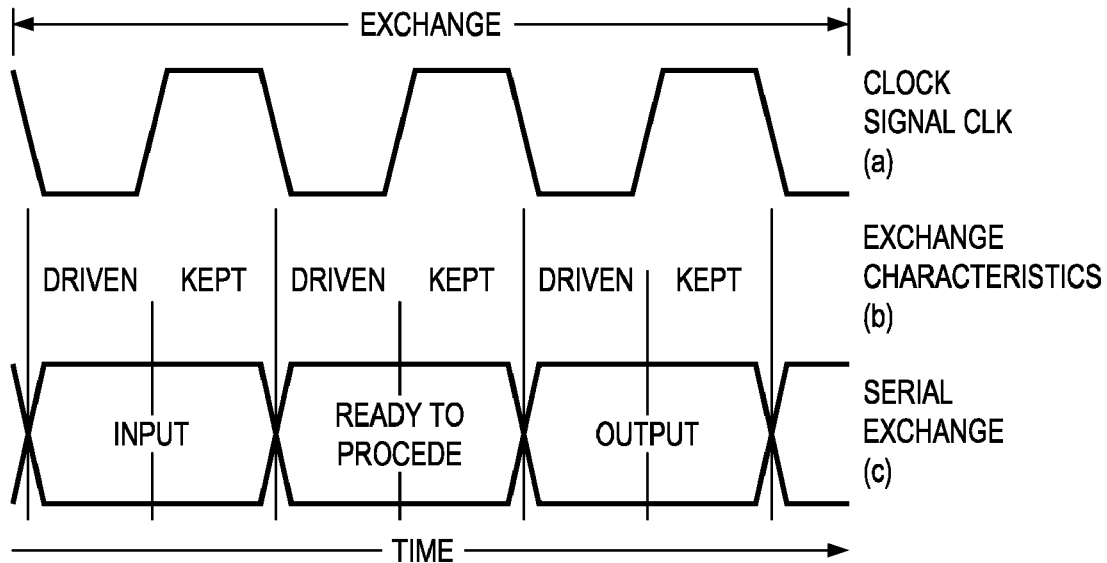
FIG. 4 illustrates data exchange for when there is a single participating finite state machine and thus no voting is required.

FIG. 4 illustrates data exchange for case B when there is a single participating finite state machine and thus no voting is required. FIG. 4a illustrates the clock signal CLK supplied to all finite state machines 110 to 119. FIG. 4b notes the exchange characteristics for case B. FIG. 4c illustrates the identity of the serial data exchanged at various times. Data input occurs during a first clock cycle. As illustrated in FIG. 4b this data is driven during a first half cycle and kept during a second half cycle. FIG. 4 illustrates a second clock cycle during which a ready signal is received from the sole participant. This is similar to the voting interval illustrated in FIG. 2, except that there is only a single vote by the sole participating finite state machine. Because no voting is required the corresponding ready signal may be used directly by controller 120 without need of the voting circuit of FIG. 3. Thus there is no provision for precharge as illustrated in FIG. 2. FIGS. 4b and 4c then show an output sequence. The next clock cycle is the finite state machine output driven by the finite state machine during a first half cycle and held by a keeper circuit during a second half cycle.

In case B no participants are chosen. The system is likely to hang not ready when voting is not used because of the manner in which the ready indication is generated. This avoided by detecting and handling this special case.

Case C has no participants and there is no participant to provide an indication it is ready to proceed.

In case C where there are no participants a hang may occur in the absence of handling this case in a special manner. With no participant generating output (RDY and OUTPUT bits) the RDY bit assumes the value of the input bit preceding it because the RDY bit is not driven. In this case the RDY bit becomes a value that indicates not ready to proceed when the input bit is the logic level corresponding to this condition. This is handled as a special case to avoid a hang not-ready-to-proceed.

Figure 5:
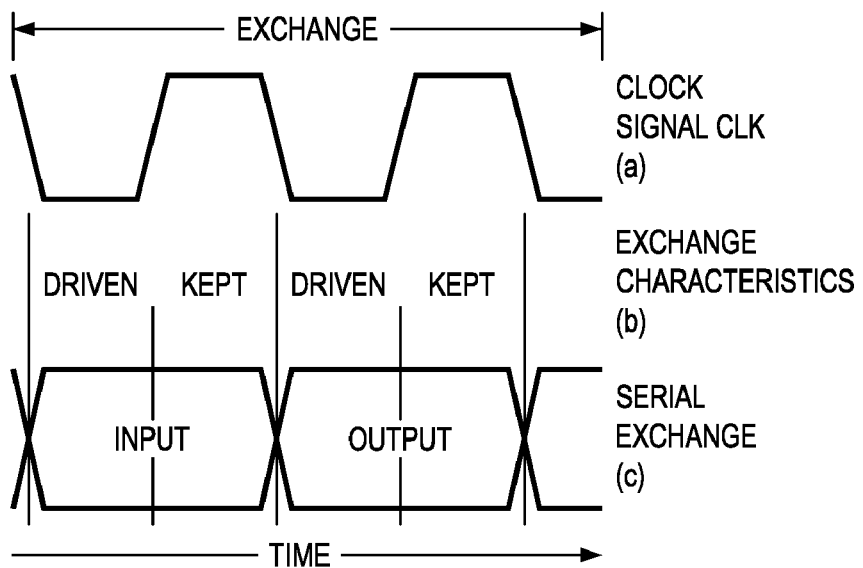
FIG. 5 illustrates data exchange for when there is no participating finite state machine and thus no voting is required.

FIG. 5 illustrates data exchange for case C when there is no participating finite state machine and thus no voting is required. FIG. 5a illustrates the clock signal CLK supplied to all finite state machines 110 to 119. FIG. 5b notes the exchange characteristics for case C. FIG. 5c illustrates the identity of the serial data exchanged at various times. Data input occurs during a first clock cycle. As illustrated in FIG.

5b this data is driven during a first half cycle and kept during a second half cycle. FIGS. 5b and 5c then show an output sequence. The next clock cycle is the finite state machine output driven by the finite state machine during a first half cycle and held by a keeper circuit during a second half cycle.

The number of participants is tracked by monitoring the selection sequence. When this monitoring reveals there are no participants, some number of non-participants other than zero are designated as indicating ready to proceed. Since the logic level for ready-to-proceed is fixed, any number of non-participants may be designated as indicating ready-to-proceed in this case. At a minimum one non-participant must respond with ready-to-proceed. The easiest solution is to have all non-participants respond with ready-to-proceed in this case.

What is claimed is:

1. A method of operating a system having multiple finite state machines, each finite state machine generating a ready signal when its operation is complete, comprising the steps of:

selecting a set of the finite state machines to participate in an operation;

supplying input to the multiple finite state machines;

if a plurality of the finite state machines are selected for operation, waiting until all selected finite state machines generate the ready signal including precharging a node with a predetermined voltage during a predetermined precharge interval of time, conditionally discharging the node corresponding to the state of the ready signal from each of the multiple finite state machines during a predetermined discharge interval of time following and distinct from the precharge interval of time, sensing a voltage on the node during a predetermined sensing interval of time following the discharge interval of time, and ending said waiting upon sensing the voltage on the node during the predetermined sensing interval of time equals the predetermined voltage;

if only one of the finite state machines is selected for operation, waiting until the selected finite state machine generates the ready signal;

if none of the finite state machines are selected for operation, waiting until at least one non-selected finite state machine generates the ready signal;

obtaining output from the selected finite state machines.

* * * * *